No. 833,933. PATENTED OCT. 23, 1906.
F. A. LAW.
HAND WHEEL.
APPLICATION FILED FEB. 14, 1903.
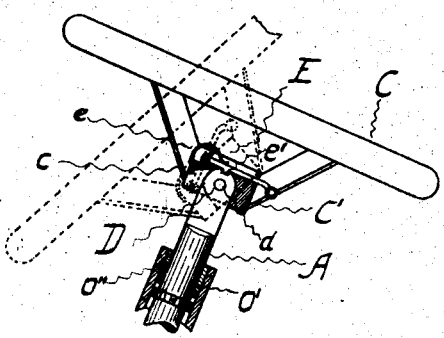
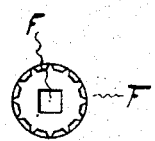
Fig. 2
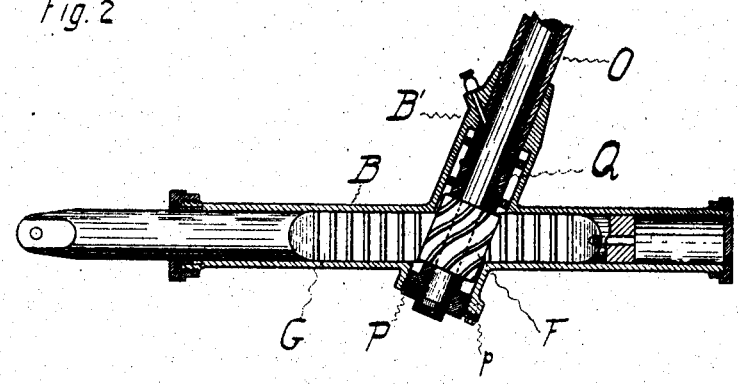
Fig. 1.
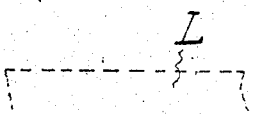
Fig. 3
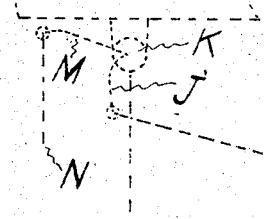
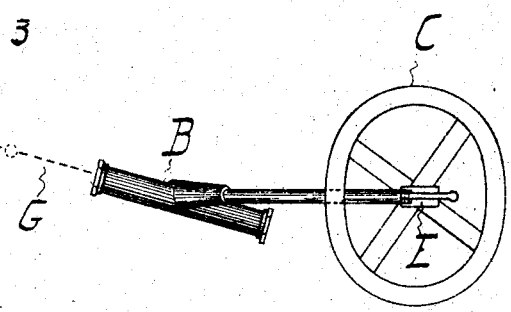
Witnesses.
M. L. Clark.
Rudolph Riege.
Inventor.
Fred A. Law,
by Hermann ⟨illegible⟩
his attorney.

UNITED STATES PATENT OFFICE.

FRED A. LAW, OF HARTFORD, CONNECTICUT, ASSIGNOR TO ELECTRIC VEHICLE COMPANY, OF JERSEY CITY, NEW JERSEY, A CORPORATION OF NEW JERSEY.

HAND-WHEEL.

No. 833,933.              Specification of Letters Patent.              Patented Oct. 23, 1906.

Application filed February 14, 1903. Serial No. 143,392.

*To all whom it may concern:*

Be it known that I, FRED A. LAW, a citizen of the United States, and a resident of the city of Hartford, county of Hartford, State of Connecticut, have invented certain new and useful Improvements in Hand-Wheels, of which the following is a specification, reference being had to the accompanying drawings, forming a part hereof.

My invention relates to steering mechanism for motor-vehicles, and particularly to means by which an occupant of the vehicle operates the deflecting-wheels for the purpose of guiding the vehicle; and it consists of certain improvements or modifications broadly covered or referred to in my application for patent heretofore filed May 16, 1902, Serial No. 107,608.

Among the objects of this invention is to provide in such a mechanism convenience of ingress and egress to and from the vehicle, while the operating parts are at the same time most accessible by a construction broadly covered in my above-mentioned application and primarily one of the specific forms shown, but not claimed, in said application, and, furthermore, to secure a simple, strong, durable construction, as will hereinafter more particularly appear.

Referring to the drawings forming a part hereof, Figure 1 is a side elevation, part in section, showing steering-pillar and its upper and lower connections embodying my invention. Fig. 2 is an end or top view of the toothed member at the lower extremity of the steering-shaft. Fig. 3 is a plan view, on smaller scale, of the mechanism shown in Fig. 1, supplemented with diagrammatic representation of the connections between the operating mechanism and a road-wheel to be deflected thereby.

In the drawings, A is a steering shaft or pillar; B, a casing at the lower end of said shaft, of which a portion B' provides an inclined base or support for the steering-shaft. The upper end of A is a rotating hand-wheel or controlling-wheel C, which is pivotally connected directly to the upper end of the shaft by means of a pivot D.

C' is the hub of the steering hand-wheel. *d* is a pin passing through the hub and the end of the steering-shaft, forming a pivot between the steering hand-wheel hub and the steering-shaft, which is longitudinally immovable on the shaft.

E is a latch mounted on or in a pivot on the wheel C or its hub C', which is held by spring *e*, so as to engage by means of the tooth *e'* the end of the shaft A when the hand-wheel C is in a position normal to the axis of the shaft, and therefore in a position to operate the steering mechanism by its rotation. Such latch may be of any desired size or form, as a bolt or locking-clamp. I prefer such locking means located, as shown, at the end of the shaft or accessible from the upper side of the hand-wheel for convenience in use.

The under side of the hub C' on one side is cut away, as at *c*, and the sides of the upper end of the shaft A are slabbed, so as to permit a secure engagement between the hand-wheel hub and the shaft and also permit the former to rotate around the pivotal connection D to a sufficient extent on one side or both.

At the lower end of the shaft is the skew-pinion F, engaging with the reciprocating member G, embodying a rack, in view of which the rotation of the pinion F moves the member G longitudinally. As shown diagrammatically in Fig. 3, the longitudinal movement of this rack member G transmits, through the link H and arm J, an oscillating movement around the pivot K to the individually-pivoted wheel L, which in turn by the connection of the arm M' and link N transmits to a second steering-wheel (not shown) the necessary deflection for steering the vehicle.

I do not wish to limit myself to the precise details of construction herein shown and described, as it will be readily seen that such may be more or less modified while still embodying my invention; but What I desire to secure by Letters Patent and claim is—

1. In combination in a steering mechanism, a rotating steering-shaft, interengaging members at the lower end thereof adapted for the deflection of steering road-wheels, a steering hand-wheel, a pivot longitudinally immovable on the upper end of said shaft connecting said hand-wheel and said shaft, and a locking means above the upper end of said shaft and accessible from the upper side of said hand-wheel.

2. The combination in a steering mechanism, of a rotating steering-shaft, a rigid base or support therefor at the lower end of said shaft, a steering hand-wheel, a hub for said hand-wheel, a longitudinally-immovable pivotal connection at the upper end of said steering-shaft coöperating directly with the hub of said hand-wheel, and a means for locking said hub and steering-shaft end in a predetermined position, said means being accessible from the upper side of said hand-wheel.

3. The combination in a steering mechanism of a steering-shaft, a single rigid support therefor at the lower end of said shaft, a tilting hand-wheel at the upper end of said shaft, a pivotal connection between said upper shaft end and hand-wheel, permitting relative movement in a single direction only, means for positively locking said hand-wheel in an operative position to rotate said shaft.

4. In a steering mechanism for motor-vehicles, a rotating steering-shaft, a rigid inclined supporting-base, a hand-wheel, a hub for said hand-wheel, a longitudinally-immovable pivotal connection between the end of said shaft and said hub, a lateral extension of the slot in said hub coöperating with the pivotal connection whereby the hand-wheel may be moved in relation to said shaft in one direction only, as and for the purpose described.

5. In a steering mechanism for motor-vehicles, a rotating shaft, a supporting-base therefor, a hand-wheel, a hub for said hand-wheel, a pivotal connection between the end of said shaft and said hub, parallel faces on each side of the upper end of said shaft and a recess in said wheel-hub coöperating with said shaft end, as and for the purpose described.

This specification signed and witnessed this 11th day of February, A. D. 1903.

FRED A. LAW.

In presence of—
M. L. CLARK,
HERMANN F. CUNTZ.